(12) United States Patent
Yu

(10) Patent No.: US 9,004,518 B2
(45) Date of Patent: Apr. 14, 2015

(54) SHOCK-ABSORBING SEAT POST FOR BICYCLE

(71) Applicant: Kuo-Pin Yu, Taichung (TW)

(72) Inventor: Kuo-Pin Yu, Taichung (TW)

( * ) Notice: Subject to any disclaimer, the term of this patent is extended or adjusted under 35 U.S.C. 154(b) by 0 days.

(21) Appl. No.: 14/072,906

(22) Filed: Nov. 6, 2013

(65) Prior Publication Data

US 2015/0069734 A1 Mar. 12, 2015

(30) Foreign Application Priority Data

Sep. 9, 2013 (TW) .............................. 102216930 U

(51) Int. Cl.
*B62K 19/36* (2006.01)
*B62J 1/02* (2006.01)

(52) U.S. Cl.
CPC ........................................ *B62J 1/02* (2013.01)

(58) Field of Classification Search
CPC ....................................................... B62K 19/36
USPC ........ 280/281, 283, 287, 274, 275; 297/195.1
See application file for complete search history.

(56) References Cited

U.S. PATENT DOCUMENTS

| | | | | |
|---|---|---|---|---|
| 3,606,383 | A * | 9/1971 | Mesinger ....................... | 280/283 |
| 5,779,249 | A * | 7/1998 | Lin ................. | 280/287 |
| 5,921,145 | A * | 7/1999 | Muser .......................... | 74/551.2 |
| 6,113,057 | A * | 9/2000 | Cheng ........................... | 248/594 |
| 6,409,130 | B1 * | 6/2002 | Maret ........................ | 248/219.2 |
| 7,125,030 | B2 * | 10/2006 | D'Aluisio et al. ............. | 280/283 |
| 7,144,029 | B1 * | 12/2006 | Heady ........................ | 280/288.4 |
| 7,380,808 | B2 * | 6/2008 | D'Aluisio et al. ............ | 280/275 |
| 7,562,932 | B2 * | 7/2009 | Chiang ........................ | 297/195.1 |
| 7,681,947 | B2 * | 3/2010 | Ritchey ..................... | 297/215.14 |
| 8,714,640 | B2 * | 5/2014 | Ritchey ..................... | 297/215.14 |
| 8,777,250 | B1 * | 7/2014 | Yu ................. | 280/275 |
| 8,833,784 | B2 * | 9/2014 | Moechnig ..................... | 280/276 |
| 2002/0149241 | A1 * | 10/2002 | Morgan, Jr. ................. | 297/195.1 |
| 2003/0080531 | A1 * | 5/2003 | Ritchey ........................ | 280/281.1 |
| 2005/0017479 | A1 * | 1/2005 | Liu ................. | 280/287 |
| 2005/0206121 | A1 * | 9/2005 | Ritchey ........................ | 280/281.1 |
| 2005/0248118 | A1 * | 11/2005 | D'Aluisio et al. ............ | 280/275 |
| 2006/0078376 | A1 * | 4/2006 | Liao ............................... | 403/378 |
| 2006/0237274 | A1 * | 10/2006 | Hsia .............................. | 188/316 |
| 2008/0315552 | A1 * | 12/2008 | Hsu ............................... | 280/283 |
| 2009/0121451 | A1 * | 5/2009 | Chiang ......................... | 280/288.4 |
| 2009/0267316 | A1 * | 10/2009 | Gonzalez et al. ............. | 280/275 |
| 2011/0266844 | A1 * | 11/2011 | Petrie et al. ................. | 297/195.1 |
| 2012/0027510 | A1 * | 2/2012 | Chen .......................... | 403/374.2 |
| 2012/0169028 | A1 * | 7/2012 | Lund et al. ................. | 280/281.1 |

* cited by examiner

*Primary Examiner* — Joseph Rocca
*Assistant Examiner* — Gabriela C Craciun
(74) *Attorney, Agent, or Firm* — Muncy, Geissler, Olds & Lowe, P.C.

(57) ABSTRACT

A shock-absorbing seat post for a bicycle includes a connecting mount, a rod member, a shock-absorbing member and a fastening unit. The connecting mount has two connecting lugs each having a first through hole, and a receiving space defined between the two connecting lugs. The rod member has a connecting insert received in the receiving space and provided with a second through hole aligned with the two first through holes. The shock-absorbing member has two lateral walls, a tube portion located between the two lateral walls and provided with an axial hole aligned with the two first though holes. The fastening unit is inserted in the two first through holes, the second through hole and the axial hole for combining the connecting mount, the rod member and the shock-absorbing member together.

11 Claims, 5 Drawing Sheets

SHOCK-ABSORBING SEAT POST FOR BICYCLE

CROSS-REFERENCE TO RELATED APPLICATIONS

This application claims priority from Taiwan Patent Application No. 102216930 filed on Sep. 9, 2013, the entire content of which is incorporated herein by reference.

BACKGROUND OF THE INVENTION

1. Field of the Invention

The present invention relates to shock-absorbing structures of bicycles and more particularly, to a shock-absorbing seat post for a bicycle.

2. Description of the Related Art

When riding bicycle on a bumpy road, bicyclist may fell uncomfortable due to vibration. To ease discomfort of the bicyclist, many bicycles may be equipped at the seat post thereof with a suspension for buffering the vibration. However, the conventional suspension for being installed with the seat post of a bicycle usually comprises metal springs for achieving the purpose of absorbing vibration, resulting in that the aforesaid conventional suspension is complicated in structure and heavy in weight, and even that a part of stepping energy from bicyclist may be absorbed by the conventional suspension to undesiredly deteriorate the transmission efficiency of energy. Therefore, for a road bicycle built for traveling at high speed with a light-weight specification, the aforesaid conventional suspension composed of metal spring is not an appropriate choice. On the other hand, when a bicyclist rides a road bicycle without suspension, the bicyclist may easily and quickly feel tired. Under this circumstance, the bicyclist may have to face a dilemma that he/she can only choose one from a bicycle having high energy transmission efficiency with light weight and a bicycle having suspension that can provide riding comfort.

SUMMARY OF THE INVENTION

The present invention has been accomplished under the circumstances in view. It is an objective of the present invention to provide a shock-absorbing seat post for a bicycle, which has the advantages of light weight, good energy transmission efficiency and good shock-absorbing effect.

To attain the above-mentioned Objective and other objectives, a shock-absorbing seat post for a bicycle is provided for being connected with a saddle of the bicycle and comprises a connecting mount, a rod member, a shock-absorbing member and a fastening unit. The connecting mount has a top portion for connecting the saddle, a bottom portion, two connecting lugs downwardly extending from the bottom portion, two first through holes respectively provided at the two connecting lugs, and a receiving space formed between the two connecting lugs. The rod member has a top portion provided with a connecting insert received in the receiving space, and a second through hole provided at the connecting insert and aligned with the two first through holes. The shock-absorbing member has a top portion located between the bottom portion of the connecting mount and the connecting insert of the rod member, two lateral walls downwardly and respectively extending from two lateral sides of the top portion of the shock-absorbing member and located between the two connecting lugs and the connecting insert, a tube portion located between the two lateral walls, and an axial hole formed inside the tube portion and aligned with the two first though holes. The fastening unit is inserted in the two first through holes, the second through hole and the axial hole for combining the connecting mount, the rod member and the shock-absorbing member together.

By means of the above-mentioned design of the shock-absorbing member of the present invention, the top portion and the lateral walls of the shock-absorbing member can serve as a buffer between the connecting mount and the rod member, and the tube portion of the shock-absorbing member can also serve as a buffer between the fastening unit and the connecting insert of the rod member, such that the shock-absorbing seat post of the present invention can provide with an appropriate buffering effect. In addition, the structural design of the shock-absorbing seat post of the present invention has the advantage of light weight and will not dramatically deteriorate the transmission efficiency of energy, such that the present invention can provide with a balanced solution to fulfill the multi-dimensional demands of the bicyclist. Further, because the connecting mount and the rod member can be separated from each other, the bicyclist may prepare a plurality of connecting mounts, on which different saddles or saddles of same type with different installation angles and/or positions are mounted, for enabling the bicyclist to rapidly replace a currently-used saddle with a desired saddle by selecting a connecting mount on which the desired saddle is mount and then changing the old saddle to the selected one.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF EMBODIMENTS

Figure 1:
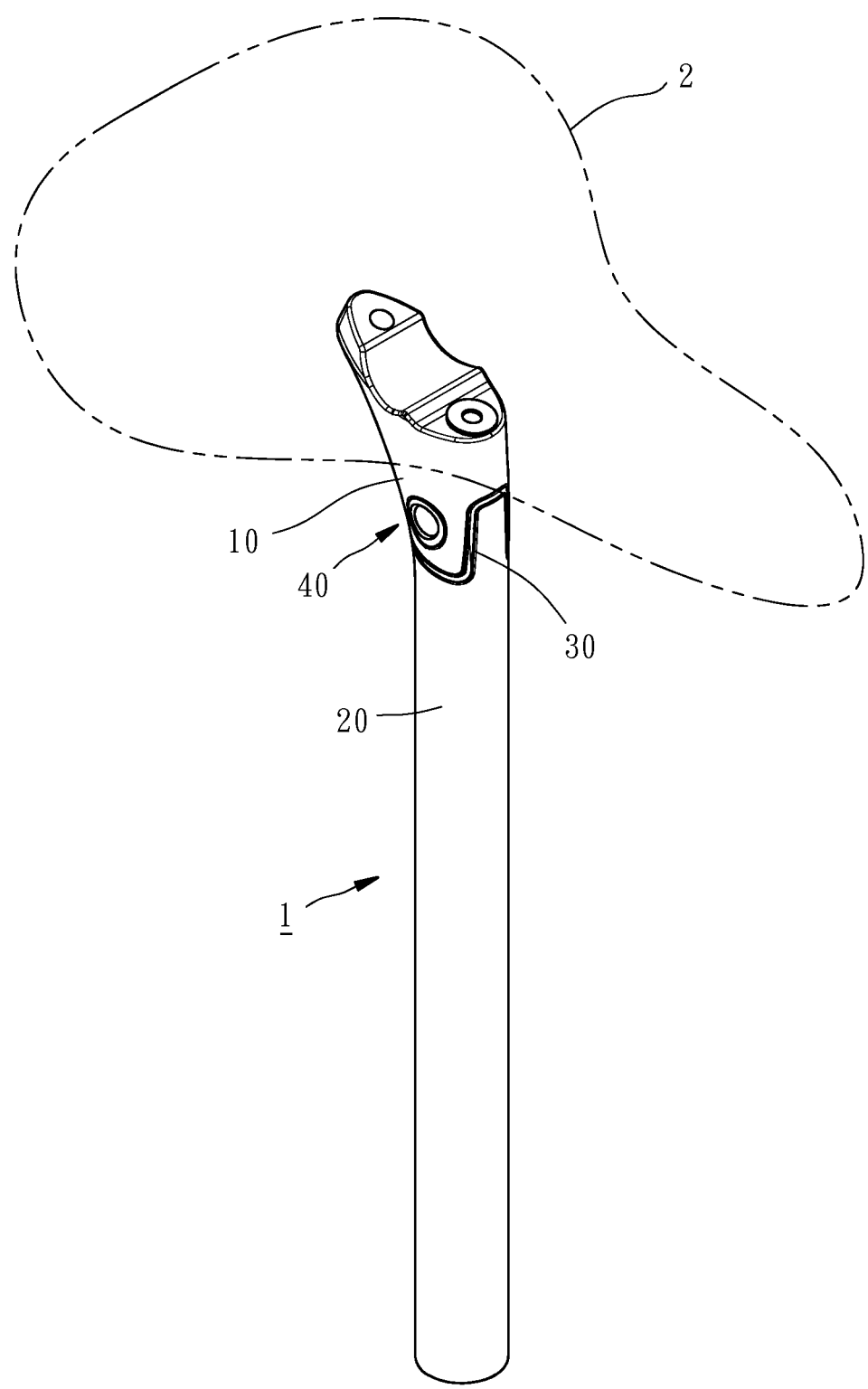
FIG. 1 is a perspective view of a shock-absorbing seat post according to a first embodiment of the present invention.
Figure 2:
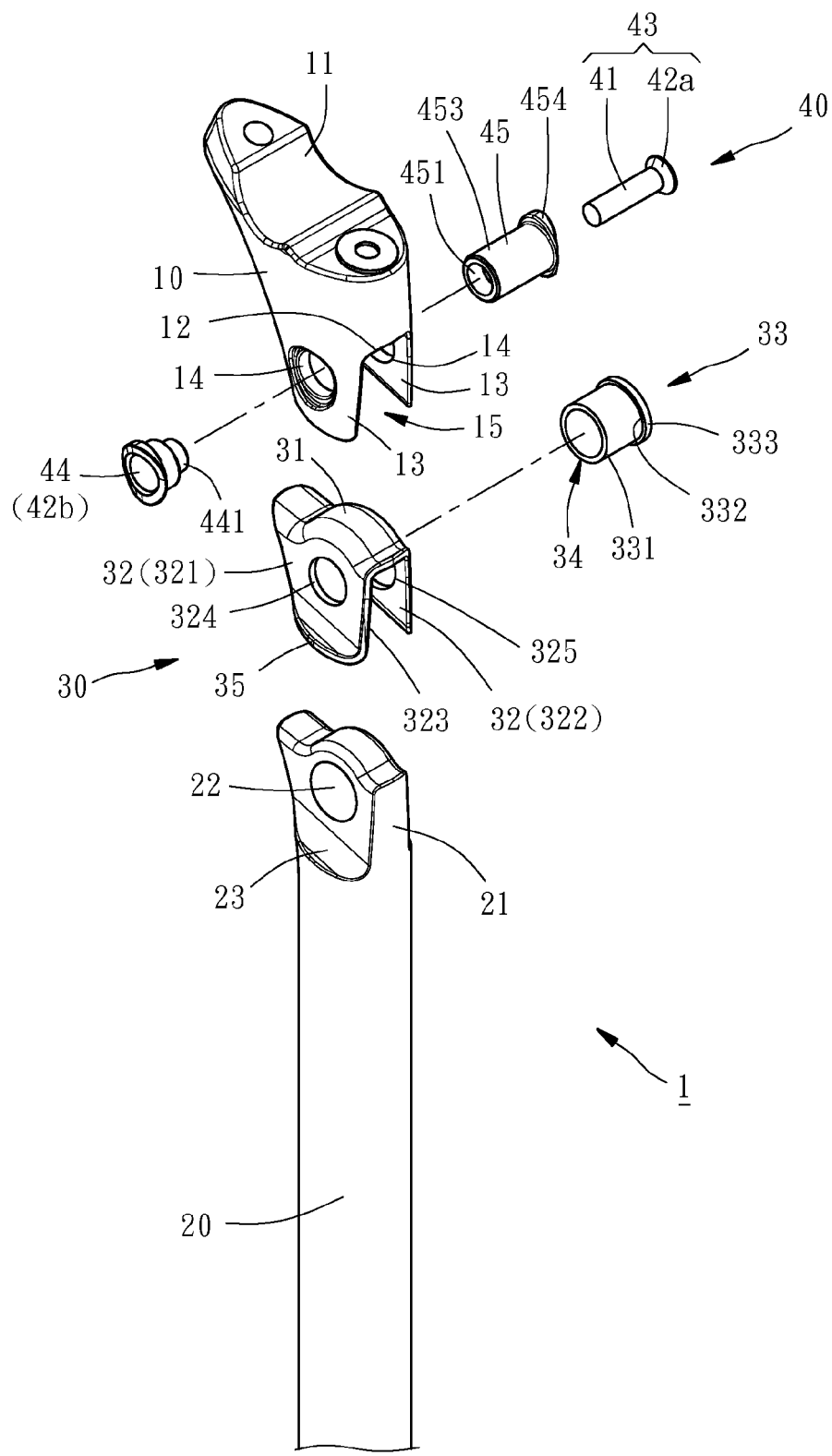
FIG. 2 is an exploded vide of the shock-absorbing seat post of the first embodiment of the present invention.
Figure 3:
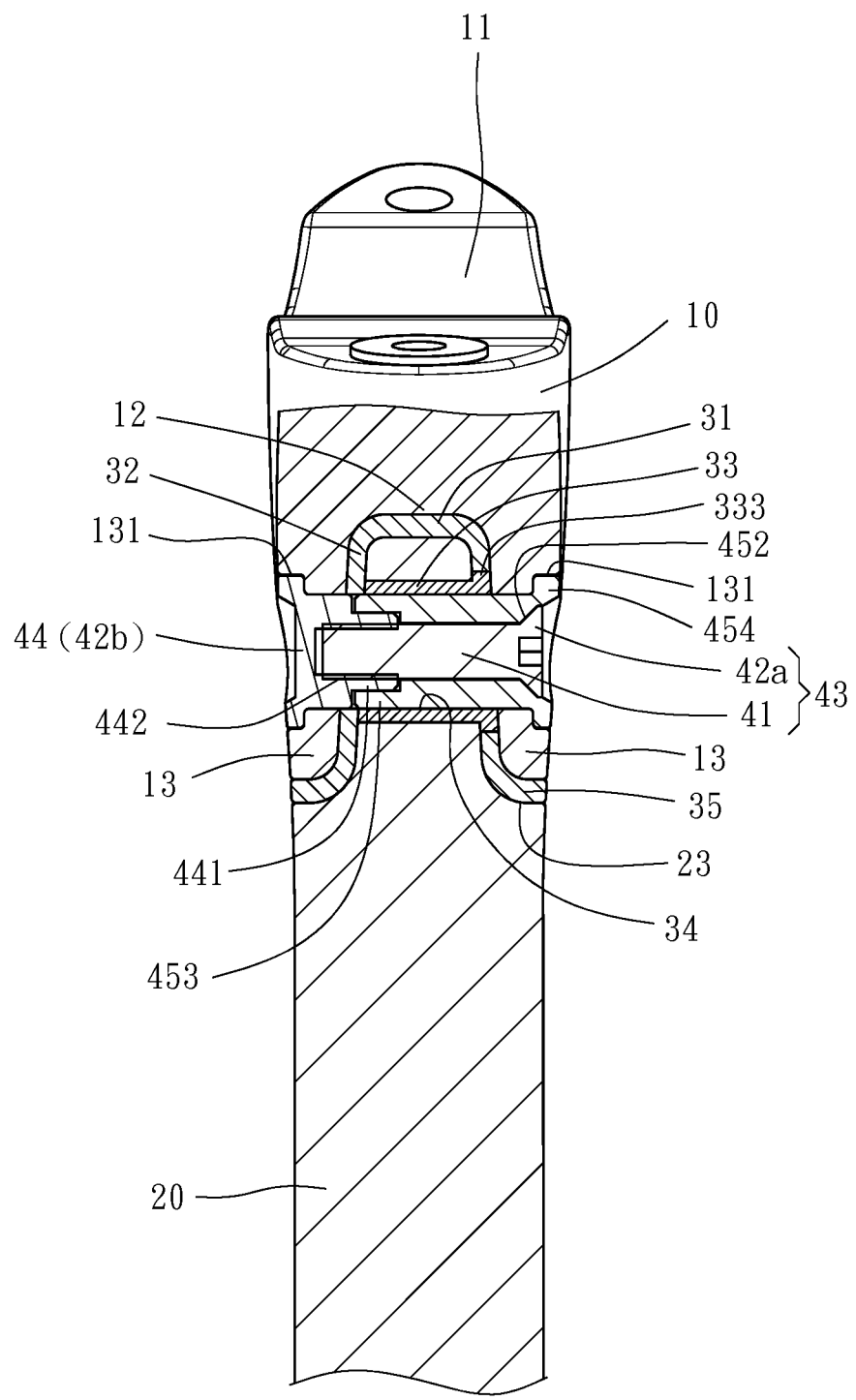
FIG. 3 is a longitudinally cross-sectional view of the shock-absorbing seat post of the first embodiment of the present invention.

Referring to FIGS. 1-3, a shock-absorbing seat post 1 provided by a first embodiment of the present invention is adapted for being connected with a saddle 2 of a bicycle. The shock-absorbing seat post 1 comprises a connecting mount 10, a rod member 20, a shock-absorbing member 30 and a fastening unit 40.

The connecting mount 10 has a top portion 11 for connecting the saddle 2, a bottom portion 12, two connecting lugs 13 extending downwardly from the bottom portion 12, two first through holes 14 substantially horizontally arranged and each provided at one of the two connecting lugs 13, and a receiving space 15 formed between the two connecting lugs 13.

The rod member 20 is adapted for being inserted into a seat tube (not shown in the drawings) of a bicycle. The rod member 20 is provided at a top portion thereof with a connecting insert 21 having a second through hole 22. To assembly the seat post 1, the connecting insert 21 is inserted into the receiving space 15 of the connecting mount 10 in such a way that the second though hole 22 is in alignment with the first through holes 14.

The aforesaid connecting mount 10 and the rod member 20 may be made of fiber-reinforced materials including, but not limited to, carbon fiber reinforced plastic, glass fiber reinforced plastic and Kevlar fiber reinforced plastic. For the plastics, thermosetting plastics, thermoplastic plastics or a mixture thereof may be used. Alternatively, the connecting mount 10 and the rod member 20 may be made of metal or metal alloy.

The shock-absorbing member 30 has atop portion 31 located between the bottom portion 12 of the connecting mount 10 and the connecting inert 21 of the rod member 20, two lateral walls 32 respectively and downwardly extending from two lateral sides of the top portion 31 and located between the connecting lugs 13 and the connecting insert 21, a tube portion 33 located between the two lateral walls 32 and inserted in the second through hole 22, and an axial hole 34 formed inside the tube portion 33 and aimed at the two first through holes 14. The shock-absorbing member 30 is made of elastic materials including, but not limited to, isobutylene isoprene rubber (IIR), silicone rubber, polyether block amide (Pebax) resin, thermoplastic rubber (TPR) or thermoplastic polyurethane (TPU).

The fastening unit 40 is inserted in the two first through holes 14, the second through hole 22 and the axial hole 34 so as to securely combine the connecting mount 10, the rod member 20 and the shock-absorbing member 30 together. In this embodiment, the fastening unit 40 comprises a bolt 43 and a nut 44, which are threadedly engaged with each other. The bolt 43 has a shank 41 and a head 42a, and the nut 44 has also a head 42b. In assembly of the shock-absorbing seat post 1, the shank 41 is inserted in the two first through holes 14, the second through hole 22 and the axial hole 34 and engaged with the nut 44 in such a way that the head 42a and the head 42b are abutted against the outer peripheries of the two connecting lugs 13, respectively. In this way, the connecting mount 10, the rod member 20 and the shock-absorbing member 30 can be combinedly and firmly assembled together as the bolt 43 and nut 44 are tighten up. This is an embodiment of the fastening unit 40. However, it will be appreciated that the fastening unit 40 may further comprises a sleeve 45 sleeved onto the bolt 43, the detail of which will be further recited hereunder.

According to the above-mentioned design of the shock-absorbing seat post 1 of the present invention, the top portion 31 and the lateral walls 32 of the shock-absorbing member 30 are used to serve as a cushion between the connecting mount 10 and the rod member 20, and the tube portion 33 of the shock-absorbing member 30 is used to also serve as a cushion between the fastening unit 40 and the connecting insert 21 of the rod member 20, such that a proper shock-absorbing effect can be provided by the present invention.

To enhance the shock-absorbing effect, the shock-absorbing member 30 further comprises two wing portions 35 outwardly and respectively extending from the bottoms of the two lateral walls 32, and the top portion of the rod member 20 further comprises two stop surfaces 23 respectively located by two lateral sides of the connecting insert 21, such that the two wing portions 35 are positioned between the bottoms of the connecting lugs 13 and the two stop surfaces 23, respectively for enhancing the shock-absorbing effect between the connecting mount 10 and the rod member 20.

In order to smoothly install the tube portion 33 of the shock-absorbing member 30 into the second through hole 22, the shock-absorbing member 30 may be configured having the following features. The tube portion 33 has a first end 331 and a second end 332 forming a flange 333. The two lateral walls 32 are classified as a first lateral wall 321 having a third through hole 324 aimed at the axial hole 34, and a second lateral wall 322 having a fourth through hole 325 complementary in shape with the flange 333, such that the first end 331 of the tube portion 33 may be abutted against an inner surface 323 of the first lateral wall 321 and the flange 333 may be embedded inside the fourth through hole 325. As a result, when the shock-absorbing member 30 is installed, the top portion 31 and the two lateral walls 32 are capped onto the connecting insert 21 in advance, and then the tube portion 33 is inserted into the second through hole 22 through the fourth through hole 325 of the second lateral wall 322, thereby completing installation of the shock-absorbing member 30.

In another aspect, to prevent wear generated between the bolt 43 and the connecting mount 10 and to make the fastening unit 40 arranged inside the first through hole 14 and the axial hole 34 have a more constant diameter, the fastening unit 40 may further comprises a sleeve 45 having a sleeve hole 451 for insertion of the shank 41 of the bolt 43, and a relatively larger diameter hole 452 communicated with the sleeve hole 451 for being abutted by the head 42a of the bolt 43. In this embodiment, the relatively larger diameter hole 452 is a countersunk hole having a taper-like profile; however, it can be realized as a counterbore having a cylinder-like profile with a constant diameter.

In order to limit the depth that the bolt 43 is engaged into the nut 44, the nut 44 is configured to have an engagement end 441 and a threaded hole 442 provided inside the engagement end 441 for being screwingly engaged with the shank 41 of the bolt 43, such that the bolt 43 and the nut 44 will be limited to be further tightened up when the an inner end 453 of the sleeve 45 is sleeved onto and stopped at the engagement end 441 of the nut 44. By this design, the nut 44 can be connected with the sleeve 45 in a flush manner, such that the gap between the fastening unit 40 and the first through holes 14 and the gap between the fastening unit 40 and the axial hole 34 can be minimized.

To prevent the head 42b of the nut 44 from protruding out of the connecting mount 10, one connecting lug 13 may be configured having an annular recess 131 surrounding the first through hole 14 for receiving the head 42h of the nut 44. Similarly, the other lugs 13 may be configured having an annular recess 131 surrounding the first though hole 14 for receiving a head 454 of the sleeve 45 so as to prevent the sleeve 45 from protruding out of the connecting mount 10 to hook a foreign object and to provide the shock-absorbing seat post 1 with a compact and smooth appearance. The two annular recesses 131 may be formed having profiles complementary in shape with the head 42b of the nut 44 and the head 454 of the sleeve 45, respectively. Each annular recess 131 may be formed of any shape, except circular shape. In this embodiment, each annular recess 131 has an elliptical shape with the major axis thereof standing vertically, such that the nut 44 and the sleeve 45 can be stationarily embedded in the annular recesses 131, respectively. That is, the nut 44 and the sleeve 45 will not rotate relative to the connecting mount 10 when the shank 41 of the bolt 43 is screwingly engaging with the threaded hole 442, facilitating assembly of the shock-absorbing seat post 1.

Figure 4:
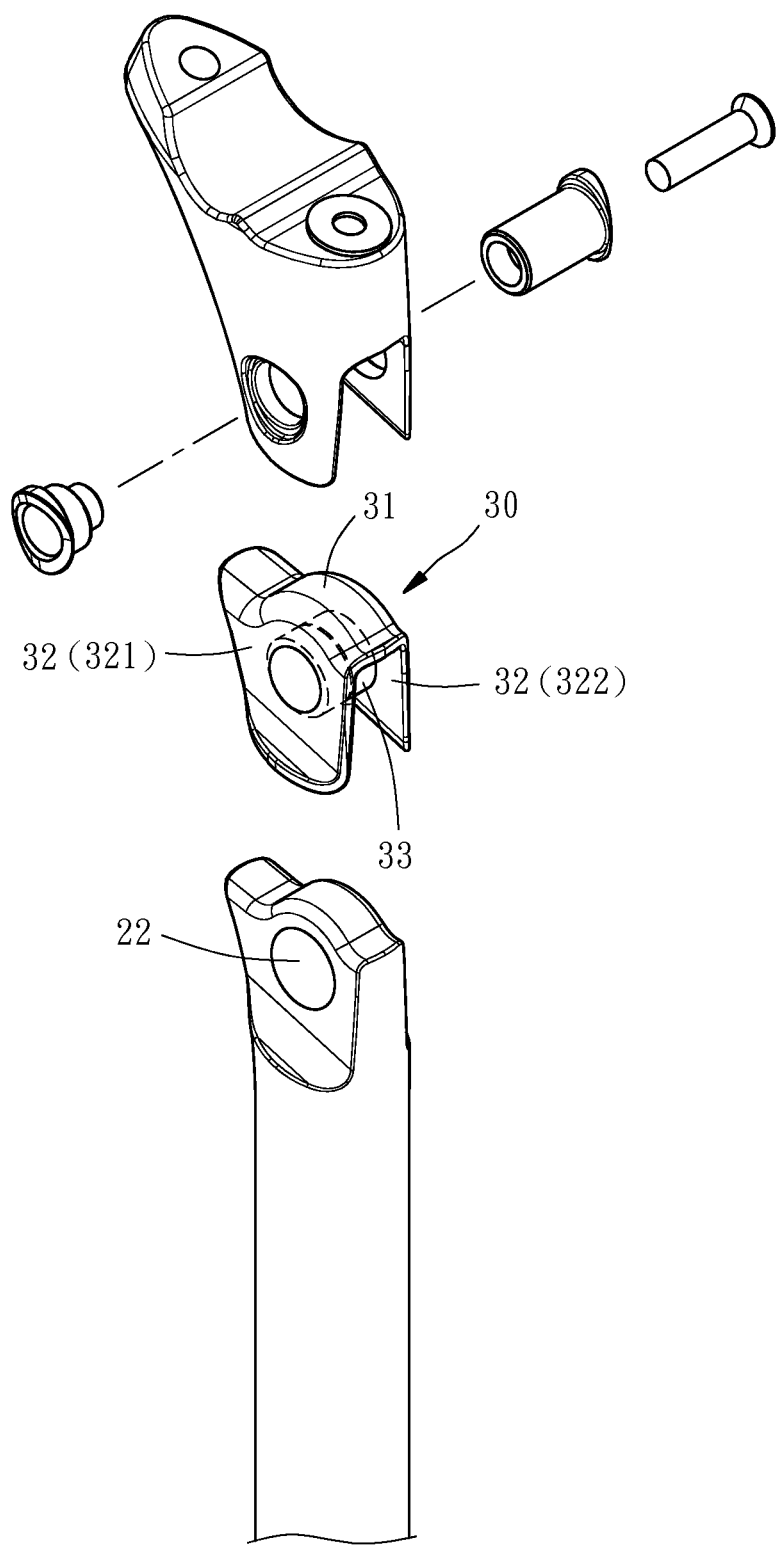
FIG. 4 is an exploded vide of a shock-absorbing seat post according to a second embodiment of the present invention.
Figure 5:
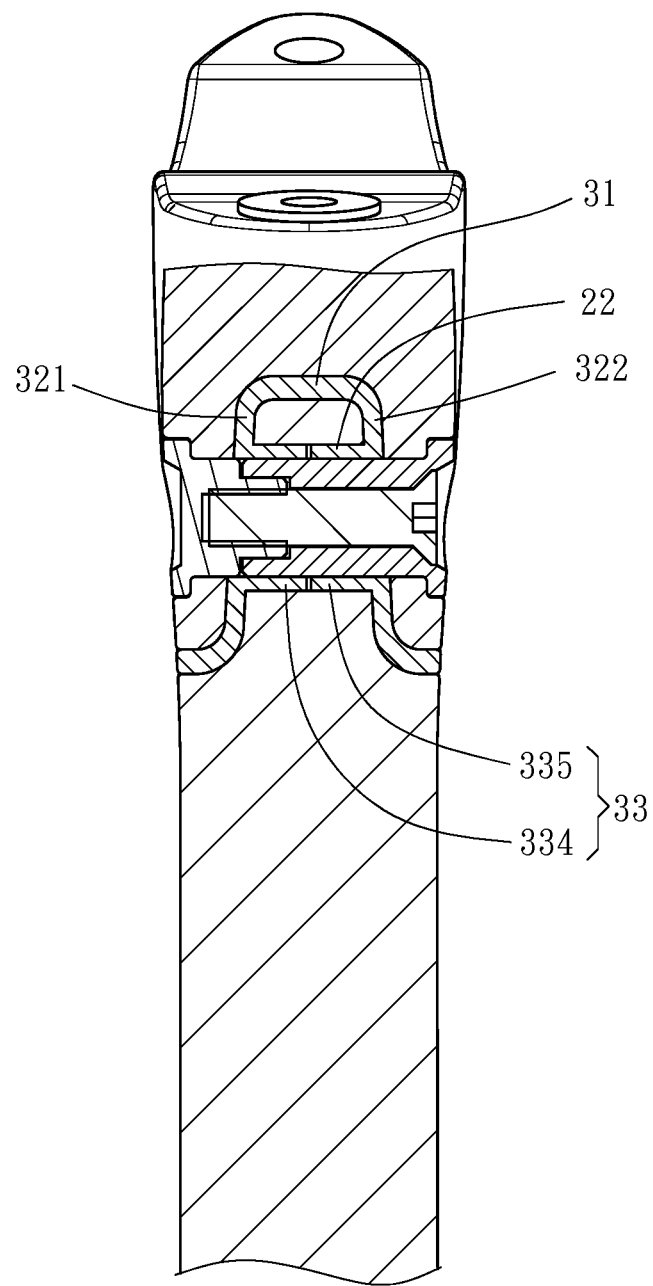
FIG. 5 is a longitudinally cross-sectional view of the shock-absorbing seat post of the second embodiment of the present invention.

It is to be mentioned that the construction of the shock-absorbing member 30 is not limited to the design disclosed in the above-mentioned embodiment. In practice, any design that enables the tube portion 33 to be disposed inside the second through hole 22 can be used for constructing the shock-absorbing member 30. For example, FIGS. 4 and 5 show a shock-absorbing seat post according to a second preferred embodiment of the present invention, wherein the top portion 31, the lateral walls 32 and the tube portion 33 are integrally connected thereamong and the tube portion 33 is cut into a first tube section 334 integrally connected with the first lateral wall 321, and a second tube section 335 integrally connected with the second lateral wall 322. By means of the deformable characteristic of the shock-absorbing member 30, the first and second tube sections 334 and 335 can be inserted into the second through hole 22 through two openings of the second through hole 22 in such a way that the free end of the first tube section 334 faces the free end of the second tube section 335. In this way, the shock-absorbing member 30 of the second embodiment can be smoothly installed too.

It can be aware from the above-mentioned description and appendix drawings that the design of sandwiching the shock-absorbing member made of elastic material between the connecting mount and the rod member can provide with an appropriate shock-absorbing effect to minimize the sense of fatigue of the bicyclist upon riding and will not extensively deteriorate the rigidity of the bicycle frame to scarify the stepping energy. Further, the shock-absorbing member of the present invention is much lighter weight than the conventional suspension, such that the present invention can meet the light-weight trend of the bicycle development so as to fulfill the multi-dimensional demands of the bicyclists.

Furthermore, in prior art, in order to replace different saddle or to adjust the angle and/or position of the saddle, the bicyclist needs to dismount the saddle from the connecting mount or to loosen the adjusting unit of the saddle adjusting mechanism. The aforesaid process is time-consuming and can not fulfill the needs in a racing field or in a place requiring repaid adjustment. For the present invention, the bicyclist can prepare a plurality of connecting mounts on which various saddles are respectively mounted with different angles and/or positions in advance, such that the purpose of changing saddle or adjusting angle and/or position of the saddle can be rapidly achieved by replacing specific connecting mount through loosening and detaching the bolt of the fastening unit so as to have a time-saving effect for facilitating pursuit of good racing score.

It is to be understood that the detailed descriptions of the constructional elements disclosed in the above-mentioned embodiments and the accompanying drawings are given by way of illustration only, and thus are not limitative of the present invention. Various modifications and substitutions of the constructional elements with equivalent elements should be covered by the claim scope of the present invention. For example, the fastening unit 40 can be substituted by any prior art fastener, not limited to the combination of the bolt, nut and sleeve.

What is claimed is:

1. A shock-absorbing seat post (1) for connecting a saddle (2) of a bicycle, the shock-absorbing seat post (1) comprising:
    a connecting mount (10) having a top portion (11) for connecting the saddle (2), a bottom portion (12), two connecting lugs (13) downwardly extending from the bottom portion (12), two first through holes (14) respectively provided at the two connecting lugs (13), and a receiving space (15) formed between the two connecting lugs (13);
    a rod member (20) having a top portion provided with a connecting insert (21) received in the receiving space (15) of the connecting mount (10), and a second through hole (22) provided at the connecting insert (21) and aligned with the two first through holes (14);
    a shock-absorbing member (30) having a top portion (31) located between the bottom portion of the connecting mount (10) and the connecting insert (21) of the rod member (20), two lateral walls (32) respectively extending downwardly from two lateral sides of the top portion (31) of the shock-absorbing member (30) and located between the two connecting lugs (13) and the connecting insert (21), a tube portion (33) located between the two lateral walls (32), and an axial hole (34) formed inside the tube portion (33) and aligned with the two first though holes (14); and
    a fastening unit (40) inserted in the two first through holes (14), the second through hole (22) and the axial hole (34) for combining the connecting mount (10), the rod member (20) and the shock-absorbing member (30) together.

2. The shock-absorbing seat post (1) as claimed in claim 1, wherein the top portion of the rod member (20) comprises two stop surfaces (23) located by two lateral sides of the connecting inert (21), respectively; the shock-absorbing member (30) comprises two wing portions (35) respectively extending from bottoms of the two lateral walls (32); each of the wing portions (35) is located between one of the connecting lugs (13) and one of the stop surfaces (23).

3. The shock-absorbing seat post (1) as claimed in claim 1, wherein the tube portion (33) of the shock-absorbing member (30) comprises a first tube section (334) connected with one of the lateral walls (32) and provided with a free end, and a second tube section (335) connected with the other of the lateral walls (32) and provided with a free end facing the free end of the first tube section (334).

4. The shock-absorbing seat post (1) as claimed in claim 1, wherein the tube portion (33) of the shock-absorbing member (30) has a first end (331) and a second end (332), and the two lateral walls (32) are classified as a first lateral wall (321) having an inner surface (323) abutted against the first end (331) of the tube portion (33), and a second lateral wall (322); the first lateral wall (321) has a third through hole (324) aligned with the axial hole (34); the second end (332) of the tube portion (33) is provided with a flange (333); the second lateral wall (322) has a fourth through hole (325) which is complementary in shape with the flange (333); the flange (333) is embedded in the fourth through hole (325).

5. The shock-absorbing seat post (1) as claimed in claim 1, wherein the fastening unit (40) comprises a bolt (43) and a nut (44) engaged with the bolt (43); the bolt (43) has a shank (41) and a head (42a) abutted against an outer periphery of one of the connecting lugs (13); the nut (44) has a head (42b) abutted against an outer periphery of the other of the connecting lugs (13).

6. The shock-absorbing seat post (1) as claimed in claim 5, wherein the fastening unit (40) further comprises a sleeve (45) having a sleeve hole (451) for insertion of the shank (41) of the bolt (43), a relatively larger diameter hole (452) communicated with the sleeve hole (451) for engagement of the head (42a) of the bolt (43).

7. The shock-absorbing seat post (1) as claimed in claim 6, wherein the nut (44) comprises an engagement end (441) and a threaded hole (442) provided inside the engagement end (441) for engagement with the shank (41) of the bolt (43); an inner end (453) of the sleeve (45) is sleeved onto the engagement end (441) of the nut (44).

8. The shock-absorbing seat post (1) as claimed in claim 6, wherein one of the connecting lugs (13) is provided at the outer periphery thereof with an annular recess (131) surrounding the first through hole (14), and the sleeve (45) has a head (454) received in the annular recess (131).

9. The shock-absorbing seat post (1) as claimed in claim 8, wherein the annular recess (131) is complementary in shape with the head (454) of the sleeve (45) and has a non-circular shape.

10. The shock-absorbing seat post (1) as claimed in claim 5, wherein one of the connecting lugs (13) is provided at the outer periphery thereof with an annular recess (131) surrounding the first through hole (14); the head (42*b*) of the nut (44) is received in the annular recess (131).

11. The shock-absorbing seat post (1) as claimed in claim 10, wherein the annular recess (131) is complementary in shape with the head (42*b*) of the nut (44) and has a non-circular shape.

\* \* \* \* \*